US011104301B2

(12) United States Patent
Watanabe

(10) Patent No.: US 11,104,301 B2
(45) Date of Patent: *Aug. 31, 2021

(54) AUTONOMOUS DRIVING VEHICLE AND DRIVERLESS TRANSPORTATION SYSTEM

(71) Applicant: TOYOTA JIDOSHA KABUSHIKI KAISHA, Toyota (JP)

(72) Inventor: Junya Watanabe, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/828,396

(22) Filed: Mar. 24, 2020

(65) Prior Publication Data

US 2020/0282953 A1 Sep. 10, 2020

Related U.S. Application Data

(63) Continuation of application No. 16/055,513, filed on Aug. 6, 2018, now Pat. No. 10,647,297.

(30) Foreign Application Priority Data

Aug. 25, 2017 (JP) .............................. JP2017-162634

(51) Int. Cl.
*B60R 25/24* (2013.01)
*B60R 25/20* (2013.01)
(Continued)

(52) U.S. Cl.
CPC .......... *B60R 25/241* (2013.01); *B60R 25/045* (2013.01); *B60R 25/2018* (2013.01);
(Continued)

(58) Field of Classification Search
CPC . B60R 25/241; B60R 25/045; B60R 25/2018; B60R 25/2036; B60R 25/252;
(Continued)

(56) References Cited

U.S. PATENT DOCUMENTS 5,289,369 A 2/1994 Hirshberg
6,636,145 B1 10/2003 Murakami et al.
(Continued)

FOREIGN PATENT DOCUMENTS

JP 2016-115364 A 6/2016

OTHER PUBLICATIONS

U.S. Appl. No. 16/055,513, filed Aug. 6, 2018.

*Primary Examiner* — Edwin C Holloway, III
(74) *Attorney, Agent, or Firm* — Sughrue Mion, PLLC

(57) ABSTRACT

When an autonomous driving vehicle picks a user up, a control device performs departure condition confirmation processing. The departure condition confirmation processing includes first authentication processing that performs authentication of the user outside the autonomous driving vehicle based on first authentication information, door lock release processing that releases a door lock in response to the completion of the first authentication processing, second authentication information provision processing that makes the user acquire second authentication information different from the first authentication information in response to the completion of the first authentication processing, second authentication processing that performs authentication of the user inside a vehicle cabin of the autonomous driving vehicle based on the second authentication information, and start permission processing that permits the start of the autonomous driving vehicle in a case where the second authentication processing is completed.

20 Claims, 10 Drawing Sheets

(51) Int. Cl.
  *G05D 1/00* (2006.01)
  *B60R 25/045* (2013.01)
  *B60R 25/25* (2013.01)
(52) U.S. Cl.
  CPC ........ *B60R 25/2036* (2013.01); *B60R 25/252* (2013.01); *G05D 1/0088* (2013.01); *G05D 2201/0212* (2013.01); *G05D 2201/0213* (2013.01)
(58) Field of Classification Search
  CPC .... B60R 25/04; B60R 25/246; G05D 1/0088; G05D 2201/0212; G05D 2201/0213; G07C 9/00166; G07C 2009/00507; G07C 2009/00531; G07C 2009/00539; G07C 2009/00547; G07C 9/00571; G07C 2209/14
  USPC ...................................... 340/5.61, 5.72, 4.62
  See application file for complete search history.

(56) References Cited

U.S. PATENT DOCUMENTS

| | | | |
|---|---|---|---|
| 6,873,840 | B1 | 3/2005 | von Alten |
| 8,732,803 | B2 | 5/2014 | Stibel et al. |
| 9,547,309 | B2 | 1/2017 | Ross et al. |
| 10,647,297 | B2* | 5/2020 | Watanabe ............ B60R 25/252 |
| 2012/0254948 | A1 | 10/2012 | Kleve et al. |
| 2015/0161832 | A1* | 6/2015 | Esselink ................ B60R 25/24 |
| | | | 340/5.22 |
| 2015/0279131 | A1 | 10/2015 | Nespolo |
| 2016/0301698 | A1 | 10/2016 | Katara et al. |
| 2017/0008490 | A1* | 1/2017 | Sako ...................... B60R 25/25 |
| 2017/0115125 | A1 | 4/2017 | Outwater et al. |
| 2018/0262891 | A1* | 9/2018 | Wu ......................... H04W 4/00 |
| 2018/0292829 | A1* | 10/2018 | Li ......................... B60W 50/10 |
| 2019/0054926 | A1 | 2/2019 | Wasekura |

* cited by examiner

AUTONOMOUS DRIVING VEHICLE AND DRIVERLESS TRANSPORTATION SYSTEM

INCORPORATION BY REFERENCE

This is a Continuation Application of U.S. application Ser. No. 16/055,513, filed Aug. 6, 2018, which claims priority from Japanese Patent Application No. 2017-162634 filed on Aug. 25, 2017. The specifications, drawings and abstracts of the prior applications are incorporated herein by reference in their entireties.

BACKGROUND

1. Technical Field

The present disclosure relates to an autonomous driving vehicle and a driverless transportation system that provide a driverless transportation service.

2. Description of Related Art

U.S. Pat. No. 9,547,309 discloses a transport arrangement system. In the transport arrangement system, in a case where a transport request is received from a user, the type of vehicle arranged for the user is determined. For example, the transport arrangement system determines whether or not to arrange an autonomous driving vehicle taking into consideration a destination designated by the transport request.

Japanese Unexamined Patent Application Publication No. 2016-115364 (JP 2016-115364 A) discloses a vehicle allocation management system using an autonomous driving vehicle. In a case where a user performs member registration, a vehicle allocation management server stores first information for authentication and second information for authentication relating to the user. In a case where a vehicle allocation request is received from the user, the vehicle allocation management server transmits the first information for authentication to the autonomous driving vehicle. The autonomous driving vehicle performs the authentication of the user using the first information for authentication. The autonomous driving vehicle receives the second information for authentication from the user, and transmits the received second information for authentication to the vehicle allocation management server. The vehicle allocation management server performs the authentication of the user using the second information for authentication, and notifies the autonomous driving vehicle of an authentication result.

US 2016/0301698 A discloses an in-vehicle authentication system of an autonomous driving vehicle. The in-vehicle authentication system determines ID information and the age of the user, the number of people, and the like as an authentication policy, and performs the authentication of the user based on the authentication policy.

US 2017/0115125 A discloses an authentication method of a user in a vehicle allocation service. A management system generates a code peculiar for a position where a vehicle picks the user up. One of the vehicle and a user terminal emits a light signal based on the code, and the other of the vehicle and the user terminal detects the light signal using a camera.

U.S. Pat. No. 8,732,803 discloses a general two-stage authentication method unrelated to a vehicle allocation service of an autonomous driving vehicle.

SUMMARY

A driverless transportation service using an unmanned autonomous driving vehicle is considered. In the driverless transportation service, the autonomous driving vehicle needs to automatically pick a user up. Specifically, the autonomous driving vehicle goes toward a pickup position desired by the user. At the pickup position desired by the user, the user gets in the autonomous driving vehicle. The autonomous driving vehicle departs toward a destination.

When the autonomous driving vehicle picks the user up, the following problem may occur. For example, in a state where the user does not get in the autonomous driving vehicle, the autonomous driving vehicle may start. Since the autonomous driving vehicle can be in an unmanned operation, the autonomous driving vehicle may start without regard to an intention of the user or circumstances.

The disclosure provides a technique capable of restraining start of an autonomous driving vehicle in a state in which a user does not get in the autonomous driving vehicle in a driverless transportation service.

A first aspect of the disclosure relates to an autonomous driving vehicle that provides a driverless transportation service to a user. The autonomous driving vehicle includes a first authentication information acquisition device, a second authentication information acquisition device, and a control device. The first authentication information acquisition device is configured to acquire first authentication information associated with the user from the user outside the autonomous driving vehicle. The second authentication information acquisition device is configured to acquire second authentication information from the user inside a vehicle cabin of the autonomous driving vehicle. The control device is configured to control the autonomous driving vehicle. When the autonomous driving vehicle picks the user up, the control device performs departure condition confirmation processing. The departure condition confirmation processing includes first authentication processing that performs authentication of the user outside the autonomous driving vehicle based on the first authentication information acquired by the first authentication information acquisition device, door lock release processing that releases a door lock of the autonomous driving vehicle in response to the completion of the first authentication processing, second authentication information provision processing that makes the user acquire the second authentication information different from the first authentication information in response to the completion of the first authentication processing, second authentication processing that performs authentication of the user inside the vehicle cabin of the autonomous driving vehicle based on the second authentication information acquired by the second authentication information acquisition device, and start permission processing that permits the start of the autonomous driving vehicle in a case where the second authentication processing is completed.

In the autonomous driving vehicle according to the first aspect of the disclosure, in the second authentication information provision processing, the control device may generate the second authentication information and may provide the generated second authentication information to a terminal of the user.

In the autonomous driving vehicle according to the first aspect of the disclosure, in the second authentication information provision processing, the control device may request a management server to generate and provide the second authentication information and may receive the second authentication information generated by the management server from the management server. The second authentication information generated by the management server may be provided from the management server to a terminal of the user.

In the autonomous driving vehicle according to the first aspect of the disclosure, after the completion of the first authentication processing, in a case where the second authentication processing is not completed even when a first predetermined time elapses, the control device may prompt the user to perform an authentication operation for the second authentication processing.

In the autonomous driving vehicle according to the first aspect of the disclosure, after the completion of the first authentication processing, in a case where the second authentication processing is not completed even when a second predetermined time longer than the first predetermined time elapses, the control device may start charging to the user authenticated by the first authentication processing.

A second aspect of the disclosure relates to a driverless transportation system that provides a driverless transportation service to a user. The driverless transportation system includes a management server and an autonomous driving vehicle. The autonomous driving vehicle is configured to be able to communicate with the management server. The autonomous driving vehicle includes a first authentication information acquisition device and a second authentication information acquisition device. The first authentication information acquisition device is configured to acquire first authentication information associated with the user from the user outside the autonomous driving vehicle. The second authentication information acquisition device is configured to acquire second authentication information from the user inside a vehicle cabin of the autonomous driving vehicle. When the autonomous driving vehicle picks the user up, the autonomous driving vehicle performs departure condition confirmation processing. The departure condition confirmation processing includes first authentication processing that performs authentication of the user outside the autonomous driving vehicle based on the first authentication information acquired by the first authentication information acquisition device, door lock release processing that releases a door lock of the autonomous driving vehicle in response to the completion of the first authentication processing, second authentication information provision processing that makes the user acquire the second authentication information different from the first authentication information in response to the completion of the first authentication processing, second authentication processing that performs authentication of the user inside the vehicle cabin of the autonomous driving vehicle based on the second authentication information acquired by the second authentication information acquisition device, and start permission processing that permits the start of the autonomous driving vehicle in a case where the second authentication processing is completed.

In the driverless transportation system according to the second aspect of the disclosure, in the second authentication information provision processing, the autonomous driving vehicle may generate the second authentication information and may provide the generated second authentication information to a terminal of the user.

In the driverless transportation system according to the second aspect of the disclosure, in the second authentication information provision processing, the autonomous driving vehicle may request the management server to generate and provide the second authentication information. The management server may generate the second authentication information and may provide the generated second authentication information to the autonomous driving vehicle and a terminal of the user.

In the driverless transportation system according to the second aspect of the disclosure, the management server may generate the first authentication information and may provide the generated first authentication information to the autonomous driving vehicle and a terminal of the user in response to a vehicle allocation request from the user.

In the driverless transportation system according to the second aspect of the disclosure, the first authentication information may be registration information of the user that is registered in the management server in advance. The management server may provide the registration information as the first authentication information to the autonomous driving vehicle in response to a vehicle allocation request from the user.

According to the aspects of the disclosure, in the departure condition confirmation processing, the two-stage authentication processing is performed. Specifically, the first authentication processing is performed to the user outside the autonomous driving vehicle before the release of the door lock. After the completion of the first authentication processing, the second authentication information different from the first authentication information is provided to the user, and the second authentication processing is performed to the user inside the vehicle cabin of the autonomous driving vehicle. In a case where the second authentication processing is completed, the start of the autonomous driving vehicle is permitted.

With the first authentication processing before the release of the door lock, another person other than the user who transmits the vehicle allocation request is restrained from getting in the autonomous driving vehicle arrived at the pickup position without permission. With the second authentication processing, the autonomous driving vehicle is restrained from starting in a state in which the user does not get in the autonomous driving vehicle.

With the two-stage authentication processing, the following effect is also obtained. For example, a case where another person who is malicious acquires the first authentication information relating to the user in an unauthorized manner with means, such as hacking, is considered. According to the aspects of the disclosure, after the completion of the first authentication processing, the second authentication information different from the first authentication information is provided to the authorized user, and the second authentication processing is performed based on the second authentication information. Accordingly, even though another person can acquire the first authentication information, another person cannot pass the second authentication processing. That is, it is not possible for another person to start the autonomous driving vehicle.

As described above, according to the aspects of the disclosure, it is possible to restrain the start of the autonomous driving vehicle in a state in which the user who transmits the vehicle allocation request does not get in the autonomous driving vehicle. That is, it is possible to restrain the start of the autonomous driving vehicle unintended by the user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described referring to the accompanying drawings.

1. First Embodiment 1-1. Driverless Transportation System

Figure 1:
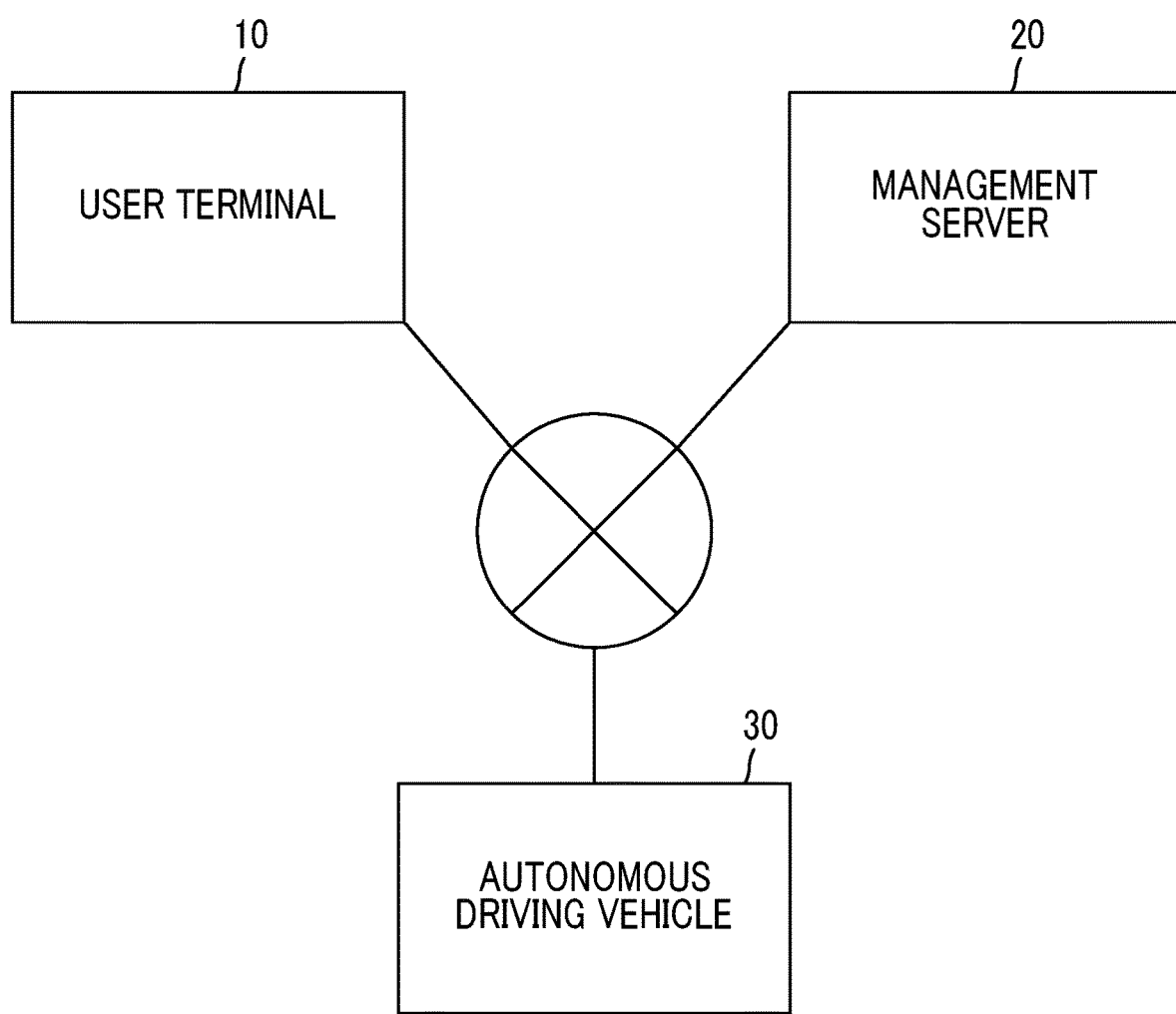
FIG. 1 is a block diagram schematically showing the configuration of a driverless transportation system according to a first embodiment of the disclosure.

FIG. 1 is a block diagram schematically showing the configuration of a driverless transportation system 1 according to a first embodiment of the disclosure. The driverless transportation system 1 provides a driverless transportation service to a user. The driverless transportation system 1 includes a user terminal 10, a management server 20, and an autonomous driving vehicle 30.

The user terminal 10 is a terminal that is carried with the user of the driverless transportation service. The user terminal 10 includes at least a processor, a storage device, and a communication device, and can perform various kinds of information processing and communication processing. For example, the user terminal 10 can communicate with the management server 20 and the autonomous driving vehicle 30 through a communication network. As the user terminal 10, a smartphone is illustrated.

The management server 20 is a server that manages the driverless transportation service. The management server 20 includes at least a processor, a storage device, and a communication device, and can perform various kinds of information processing and communication processing. For example, the management server 20 can communicate with the user terminal 10 and the autonomous driving vehicle 30 through the communication network. The management server 20 manages information of the user. The management server 20 manages vehicle allocation or the like of the autonomous driving vehicle 30.

The autonomous driving vehicle 30 can be in an unmanned operation. The user gets in the autonomous driving vehicle 30, and the autonomous driving vehicle 30 provides the driverless transportation service to the user. The autonomous driving vehicle 30 can communicate with the user terminal 10 and the management server 20 through the communication network.

A basic flow of the driverless transportation service is as follows.

The user transmits a vehicle allocation request using the user terminal 10. The vehicle allocation request includes a pickup position desired by the user, or the like. The vehicle allocation request is sent to the management server 20 through the communication network. The management server 20 selects the autonomous driving vehicle 30 that provides the service to the user and sends information of the vehicle allocation request to the selected autonomous driving vehicle 30. The autonomous driving vehicle 30 that receives information of the vehicle allocation request automatically goes toward the pickup position desired by the user.

The autonomous driving vehicle 30 arrives at the pickup position desired by the user and is stopped. The user gets in the autonomous driving vehicle 30. The user sends a destination to the autonomous driving vehicle 30. Alternatively, information of the destination may be included in the vehicle allocation request. The autonomous driving vehicle 30 automatically travels toward the destination. The autonomous driving vehicle 30 arrives at the destination and is stopped. The user gets off the autonomous driving vehicle 30.

1-2. Outline of Departure Condition Confirmation Processing

When the autonomous driving vehicle 30 picks the user up in the driverless transportation service, the following problem may occur. For example, the autonomous driving vehicle 30 may start without permission while the user is loading a cargo in a trunk of the autonomous driving vehicle 30. As another example, another person other than the user who transmits the vehicle allocation request may get in the autonomous driving vehicle 30 arrived at the pickup position without permission and may start the autonomous driving vehicle 30.

As described above, in a state in which the user does not get in the autonomous driving vehicle 30, the autonomous driving vehicle 30 may start. Since the autonomous driving vehicle 30 can be in an unmanned operation, the autonomous driving vehicle 30 may start without regard to an intention of the user or circumstances. The user feels a sense of discomfort or inconvenience with the unintended start described above. This causes degradation of reliability to the autonomous driving vehicle 30 and the driverless transportation service.

According to the first embodiment of the disclosure, a "departure condition" for permitting the start of the autonomous driving vehicle 30 at the pickup position desired by the user is specified. Determination is made whether or not the departure condition is satisfied before the autonomous driving vehicle 30 departs from the pickup position desired by the user toward the destination. The start of the autonomous driving vehicle 30 is prohibited until the departure condition is satisfied. In a case where the departure condition is satisfied, the start of the autonomous driving vehicle 30 is permitted. The processing is hereinafter referred to as "departure condition confirmation processing".

Figure 2:
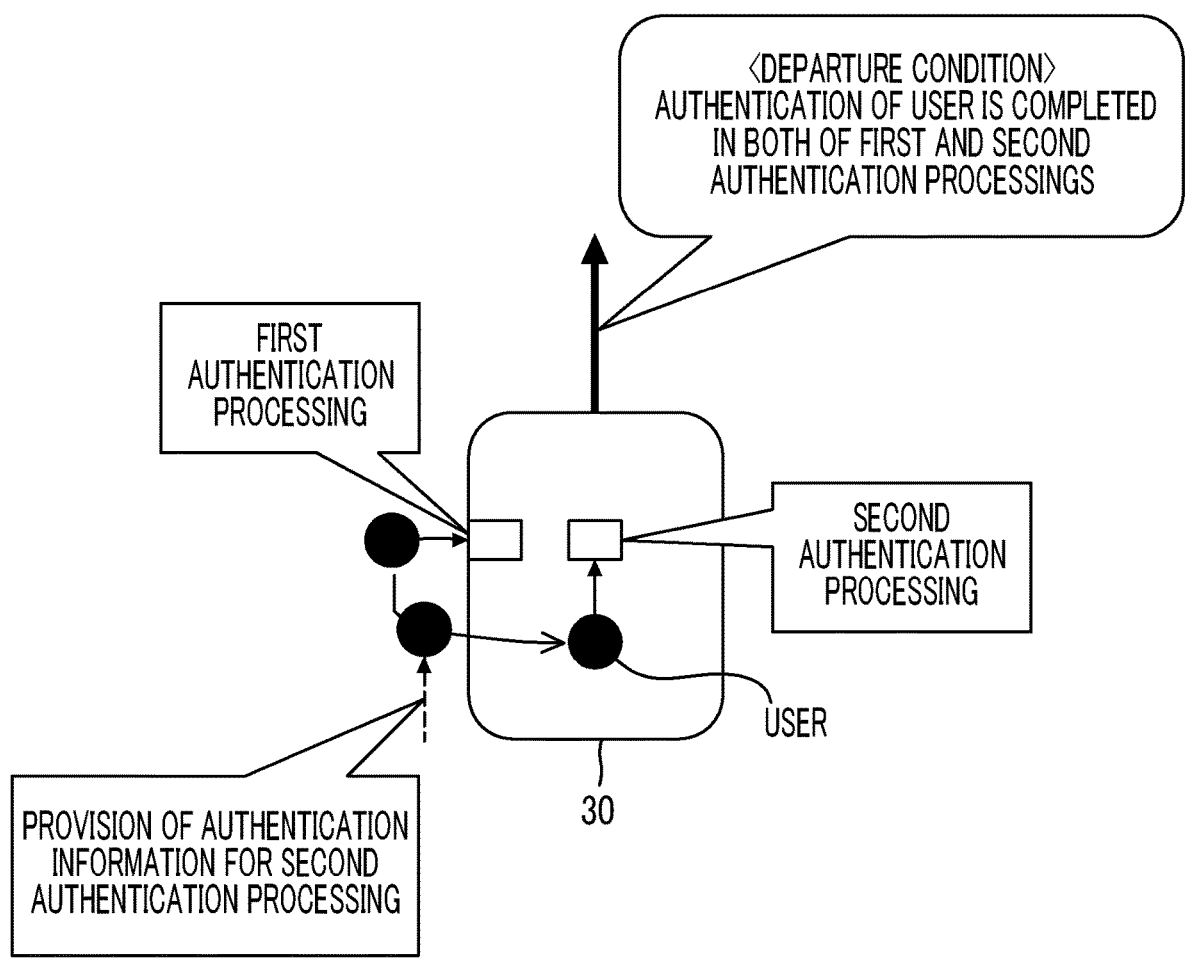
FIG. 2 is a conceptual diagram illustrating departure condition confirmation processing in an autonomous driving vehicle according to the first embodiment of the disclosure.

FIG. 2 is a conceptual diagram illustrating the departure condition confirmation processing in the autonomous driving vehicle 30 according to the first embodiment of the disclosure. According to the first embodiment of the disclosure, the departure condition confirmation processing includes two-stage authentication processing. The two-stage authentication processing is "first authentication processing" for performing authentication of the user outside the autonomous driving vehicle 30 and "second authentication processing" for performing authentication of the user inside a vehicle cabin of the autonomous driving vehicle 30.

In more detail, in a case where the autonomous driving vehicle 30 arrives at the pickup position desired by the user, the autonomous driving vehicle 30 performs the first authentication processing to the user outside the autonomous driving vehicle 30. At this time, a door of the autonomous driving vehicle 30 is yet locked. In a case where the first authentication processing is completed, the autonomous driving vehicle 30 releases a door lock. In a case where the door lock is released, the user gets in the autonomous driving vehicle 30.

Authentication information for use in the second authentication processing is provided to the user terminal 10 transmitting the vehicle allocation request in response to the completion of the first authentication processing. A provision source of the authentication information may be the autonomous driving vehicle 30 or may be the management server 20. The user gets in the autonomous driving vehicle 30 and notifies the autonomous driving vehicle 30 of the authentication information received by the user terminal 10. The autonomous driving vehicle 30 performs the second authentication processing to the user inside the vehicle cabin of the autonomous driving vehicle 30 based on the authentication information. In a case where the second authentication processing is completed, the start of the autonomous driving vehicle 30 is permitted.

As described above, the departure condition in the first embodiment of the disclosure is that authentication of the user is completed in both of the first authentication processing and the second authentication processing. With the first authentication processing before the release of the door lock, another person other than the user who transmits the vehicle allocation request is restrained from getting in the autonomous driving vehicle 30 arrived at the pickup position without permission. With the second authentication processing, the autonomous driving vehicle 30 is restrained from starting in a state in which the user does not get in the autonomous driving vehicle 30.

Hereinafter, the configuration of the autonomous driving vehicle 30 and the departure condition confirmation processing according to the first embodiment of the disclosure will be described in detail.

1-3. Configuration Example of Autonomous Driving Vehicle

Figure 3:
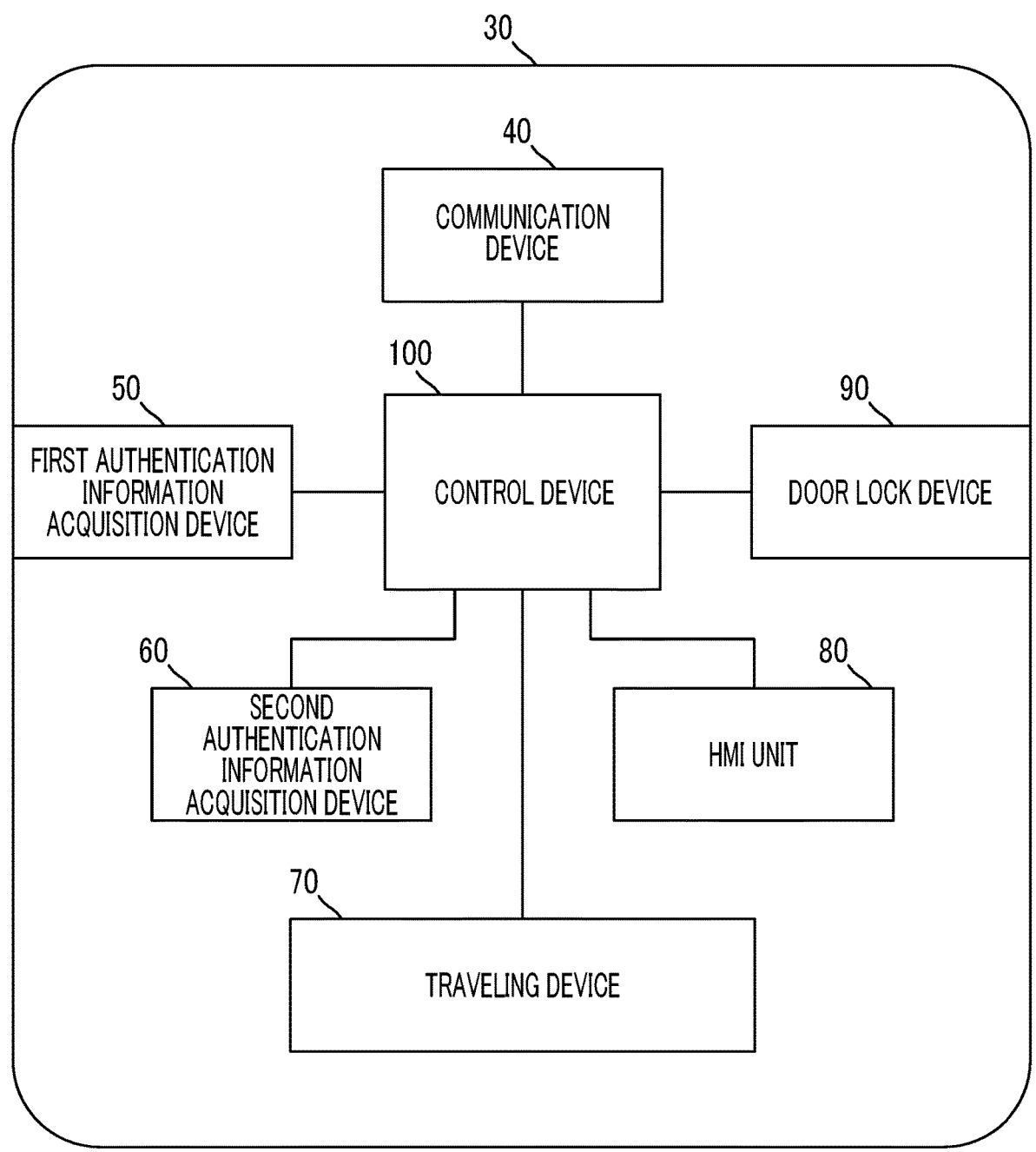
FIG. 3 is a block diagram showing a configuration example of the autonomous driving vehicle according to the first embodiment of the disclosure.

FIG. 3 is a block diagram showing a configuration example of the autonomous driving vehicle 30 according to the first embodiment of the disclosure. The autonomous driving vehicle 30 includes a communication device 40, a first authentication information acquisition device 50, a second authentication information acquisition device 60, a traveling device 70, a human machine interface (HMI) unit 80, a door lock device 90, and a control device 100.

The communication device 40 performs communication with the outside of the autonomous driving vehicle 30. Specifically, the communication device 40 performs communication with the user terminal 10 through the communication network. The communication device 40 performs communication with the management server 20 through the communication network.

The first authentication information acquisition device 50 acquires authentication information for use in the first authentication processing from the user outside the autonomous driving vehicle 30. The authentication information for use in the first authentication processing is hereinafter referred to as "first authentication information". The first authentication information is associated with the user who transmits the vehicle allocation request.

For example, the first authentication information is provided to the user in a format of a quick response (QR) code (Registered Trademark). In this case, the first authentication information acquisition device 50 has a QR code reader that reads the QR code. The user displays the QR code indicating the first authentication information on a display unit of the user terminal 10 and puts the display unit over the QR code reader. The first authentication information acquisition device 50 can acquire the first authentication information by reading the QR code.

As another example, the first authentication information may be a personal identification number (PIN) code. In this case, the first authentication information acquisition device 50 has a communication device that performs communication with the user terminal 10. The user transmits the PIN code using the user terminal 10 and requests for authentication. The first authentication information acquisition device 50 receives the first authentication information (PIN code) sent from the user terminal 10.

As still another example, the first authentication information may be biological information of the user. In this case, the first authentication information acquisition device 50 has a biological information reader that reads the biological information of the user. For example, a case where a "fingerprint" is used as the biological information of the user is considered. In this case, the first authentication information acquisition device 50 has a fingerprint reader. The user puts a finger over the fingerprint reader. The first authentication information acquisition device 50 reads fingerprint information of the user as the first authentication information.

As still another example, the first authentication information may be recorded in an integrated circuit (IC) card or a magnetic card carried with the user. In this case, the first authentication information acquisition device 50 has a card reader (IC card reader or magnetic card reader). The first authentication information acquisition device 50 reads the first authentication information using the card reader.

The first authentication information acquisition device 50 is provided to be accessed from the outside of the autonomous driving vehicle 30. Typically, the first authentication information acquisition device 50 is provided on the outer surface of the autonomous driving vehicle 30. The first authentication information acquisition device 50 may be covered with a cover. Alternatively, in a case where the first authentication information acquisition device 50 is a communication device, the first authentication information acquisition device 50 does not need to be provided on the outer surface of the autonomous driving vehicle 30. As long as the first authentication information can be acquired from the user outside the autonomous driving vehicle 30, the position where the first authentication information acquisition device 50 is provided is optional.

The second authentication information acquisition device 60 acquires authentication information from the user inside the vehicle cabin of the autonomous driving vehicle 30. In order to acquire the authentication information from the user inside the vehicle cabin of the autonomous driving vehicle 30, the second authentication information acquisition device 60 is provided inside the autonomous driving vehicle 30. The authentication information acquired by the second authentication information acquisition device 60 is used in the second authentication processing. The authentication information for use in the second authentication processing is hereinafter referred to as "second authentication information".

For example, the second authentication information is provided to the user in a format of a QR code. In this case, the second authentication information acquisition device 60 has a QR code reader that reads the QR code. The user displays the QR code indicating the second authentication information on the display unit of the user terminal 10 and puts the display unit over the QR code reader. The second authentication information acquisition device 60 can acquire the second authentication information by reading the QR code.

As another example, the second authentication information may be a PIN code. In this case, the second authentication information acquisition device 60 has a communication device that performs communication with the user terminal 10. The user transmits the PIN code using the user terminal 10 and requests for authentication. The second authentication information acquisition device 60 receives the second authentication information (PIN code) sent from the user terminal 10. As a communication system in this case, a communication system (for example: Wi-Fi) in which an effective communication distance is limited to the inside of the autonomous driving vehicle 30 is used. This is to restrain the second authentication information from being received from the user outside the autonomous driving vehicle 30 in the second authentication processing.

The traveling device 70 includes a steering device, a drive device, and a braking device. The steering device steers wheels. The drive device is a power source that generates drive power. As the drive device, an electric motor or an engine is illustrated. The braking device generates braking force.

The HMI unit 80 is an interface that notifies the user of information and receives information from the user. For example, the HMI unit 80 includes a display device, a speaker, an input device, and a microphone. The HMI unit 80 can notify the user of various kinds of information through the display device or the speaker. As the input device, a touch panel, a switch, or a button is illustrated. The user can input various kinds of information to the HMI unit 80 using the input device or the microphone.

The door lock device 90 locks the door of the autonomous driving vehicle 30 or releases the door lock.

The control device 100 controls the autonomous driving vehicle 30. In particular, the control device 100 controls the driverless transportation service with the autonomous driving vehicle 30. For example, the control device 100 performs control such that the traveling device 70 controls traveling of the autonomous driving vehicle 30. Typically, the control device 100 is a microcomputer including a processor, a memory, and an input/output interface. The control device 100 is also referred to as an electronic control unit (ECU).

1-4. Departure Condition Confirmation Processing

When the autonomous driving vehicle 30 picks the user up, the control device 100 performs the departure condition confirmation processing for determining whether or not the departure condition is satisfied. As shown in FIG. 2, the departure condition is that authentication of the user is completed in both of the first authentication processing and the second authentication processing. The control device 100 prohibits the start of the autonomous driving vehicle 30 until the departure condition is satisfied. In a case where the departure condition is satisfied, the control device 100 permits the start of the autonomous driving vehicle 30.

Figure 4:
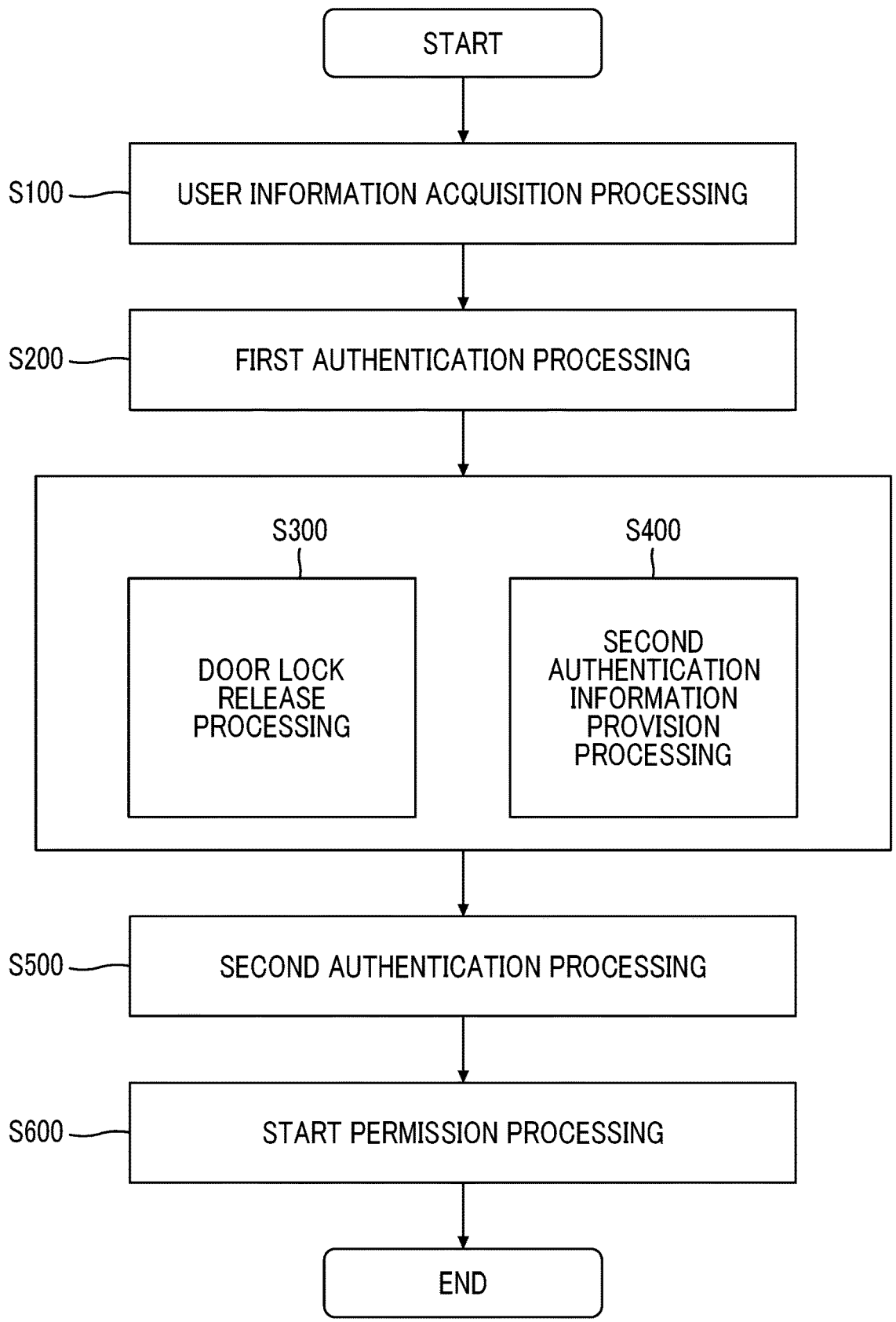
FIG. 4 is a flowchart showing the departure condition confirmation processing in the autonomous driving vehicle according to the first embodiment of the disclosure.

FIG. 4 is a flowchart showing the departure condition confirmation processing in the control device 100 of the autonomous driving vehicle 30 according to the first embodiment of the disclosure. Hereinafter, the departure condition confirmation processing according to the first embodiment of the disclosure will be described in detail.

1-4-1. User Information Acquisition Processing (Step S100)

The control device 100 acquires user information from the management server 20 through the communication device 40. The user information is information relating to the user who is picked up by the autonomous driving vehicle 30, and includes, for example, the pickup position desired by the user. The first authentication information for use in the first authentication processing is also included in the user information.

Figure 5:
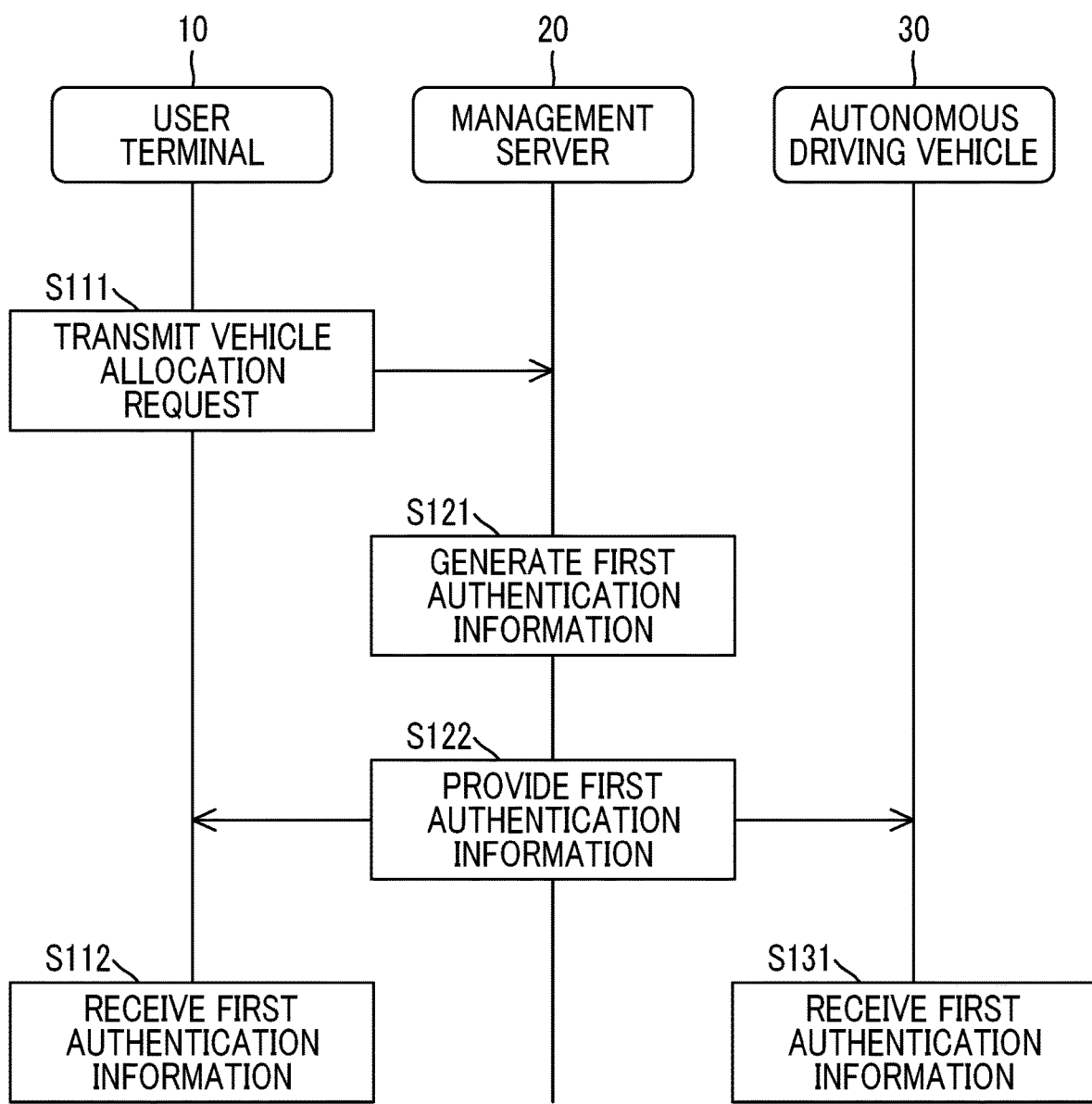
FIG. 5 is a conceptual diagram showing an example of a distribution method of first authentication information in a management server according to the first embodiment of the disclosure.

FIG. 5 shows an example of a distribution method of the first authentication information with the management server 20 according to the first embodiment of the disclosure. The user sends the vehicle allocation request to the management server 20 using the user terminal 10 (Step S111). The management server 20 generates the first authentication information associated with the user in response to the vehicle allocation request (Step S121). The management server 20 provides the generated first authentication information to the user terminal 10 and the autonomous driving vehicle 30 (Step S122). The control device 100 of the autonomous driving vehicle 30 receives the first authentication information from the management server 20 through the communication device 40 (Step S131). The user terminal 10 receives the first authentication information from the management server 20 (Step S112). For example, the first authentication information is provided to the user terminal 10 in a format of a QR code or a PIN code.

Figure 6:
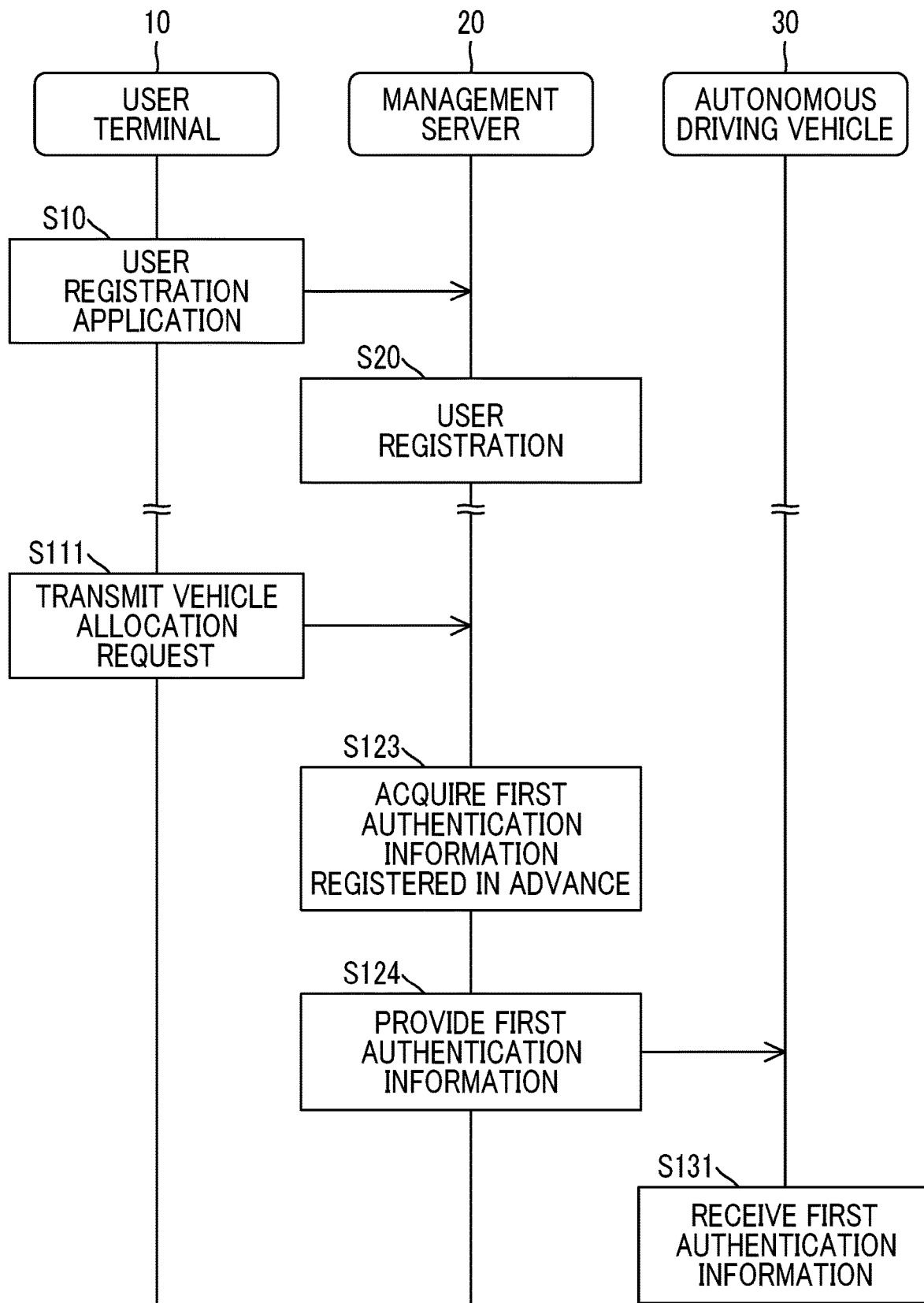
FIG. 6 is a conceptual diagram showing another example of the distribution method of the first authentication information in the management server according to the first embodiment of the disclosure.

FIG. 6 shows another example of the distribution method of the first authentication information with the management server 20 according to the first embodiment of the disclosure. In the example shown in FIG. 6, at least a part of the registration information of the user registered in the management server 20 in advance is used as the first authentication information. For example, biological information (for example: fingerprint) of the user is registered as the registration information and is used as the first authentication information. Alternatively, membership information of the user may be used as the first authentication information.

In more detail, the user performs a user registration application using the user terminal 10 (Step S10). The management server 20 performs user registration processing (Step S20). The registration information of the user is registered (stored) in the management server 20 in advance. Thereafter, the user sends the vehicle allocation request to the management server 20 using the user terminal 10 (Step S111). The management server 20 acquires at least a part of the registration information of the user as the first authentication information in response to the vehicle allocation request (Step S123). The management server 20 provides the acquired first authentication information to the autonomous driving vehicle 30 (Step S124). The control device 100 of the autonomous driving vehicle 30 receives the first authentication information from the management server 20 through the communication device 40 (Step S131). In the first embodiment of the disclosure, the first authentication information does not need to be provided from the management server 20 to the user terminal 10.

1-4-2. First Authentication Processing (Step S200)

In a case where the autonomous driving vehicle 30 arrives at the pickup position desired by the user, the control device 100 performs the first authentication processing. In the first authentication processing, the control device 100 performs authentication of the user outside the autonomous driving vehicle 30. For authentication, the control device 100 acquires the first authentication information from the user outside the autonomous driving vehicle 30 using the above-described first authentication information acquisition device 50.

For example, the user displays a QR code indicating the first authentication information on the display unit of the user terminal 10 and puts the display unit over the first authentication information acquisition device 50 (QR code reader). The first authentication information acquisition device 50 acquires the first authentication information by reading the QR code.

As another example, the user transmits a PIN code indicating the first authentication information using the user terminal 10. The first authentication information acquisition device 50 (communication device) receives the first authentication information (PIN code) sent from the user terminal 10.

In still another example, the first authentication information is a fingerprint of the user. In this case, the user puts the finger over the first authentication information acquisition device 50 (fingerprint reader). The first authentication information acquisition device 50 reads fingerprint information of the user as the first authentication information.

In still another example, the first authentication information is recorded in an IC card or a magnetic card carried with the user. The user makes the first authentication information acquisition device 50 (card reader) read the first authentication information recorded in the IC card or the magnetic card.

The control device 100 performs authentication of the user based on the first authentication information acquired from the management server 20 in Step S100 and the first authentication information acquired from the user using the first authentication information acquisition device 50. In a case where authentication of the user is successful, the first authentication processing is completed. In a case where the first authentication processing is completed, the process progresses to next Steps S300 and S400.

1-4-3. Door Lock Release Processing (Step S300)

The control device 100 performs door lock release processing in response to the completion of the first authentication processing. Specifically, the control device 100 performs control such that the door lock device 90 releases the door lock of the autonomous driving vehicle 30. In a case where the door lock is released, the user gets in the autonomous driving vehicle 30.

1-4-4. Second Authentication Information Provision Processing (Step S400)

The control device 100 performs second authentication information provision processing in response to the completion of the first authentication processing. In the second authentication information provision processing, the control device 100 makes the user who sends the vehicle allocation request acquire the second authentication information for use in the second authentication processing. For example, the second authentication information is provided to the user terminal 10 in a format of a QR code or a PIN code.

Figure 7:
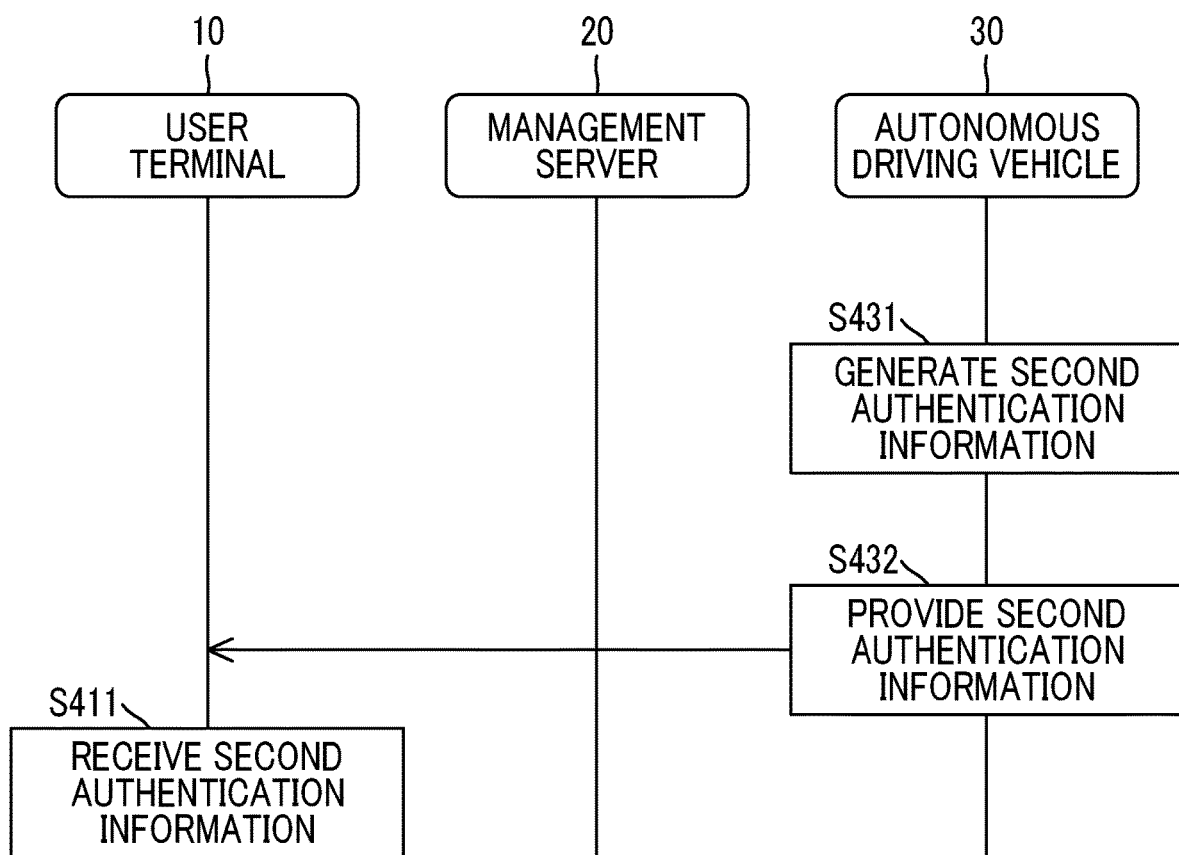
FIG. 7 is a conceptual diagram showing an example of second authentication information provision processing according to the first embodiment of the disclosure.

FIG. 7 shows an example of the second authentication information provision processing (Step S400) according to the first embodiment of the disclosure. The control device 100 of the autonomous driving vehicle 30 generates the second authentication information (Step S431). The control device 100 provides the generated second authentication information to the user terminal 10 (Step S432). For example, the control device 100 transmits the second authentication information to the user terminal 10 using the communication device 40. Alternatively, the control device 100 may transmit the second authentication information to the management server 20 using the communication device 40, and the management server 20 may transfer the second authentication information to the user terminal 10. That is, the control device 100 may provide the second authentication information to the user terminal 10 through the management server 20. The user terminal 10 receives the second authentication information (Step S411).

Figure 8:
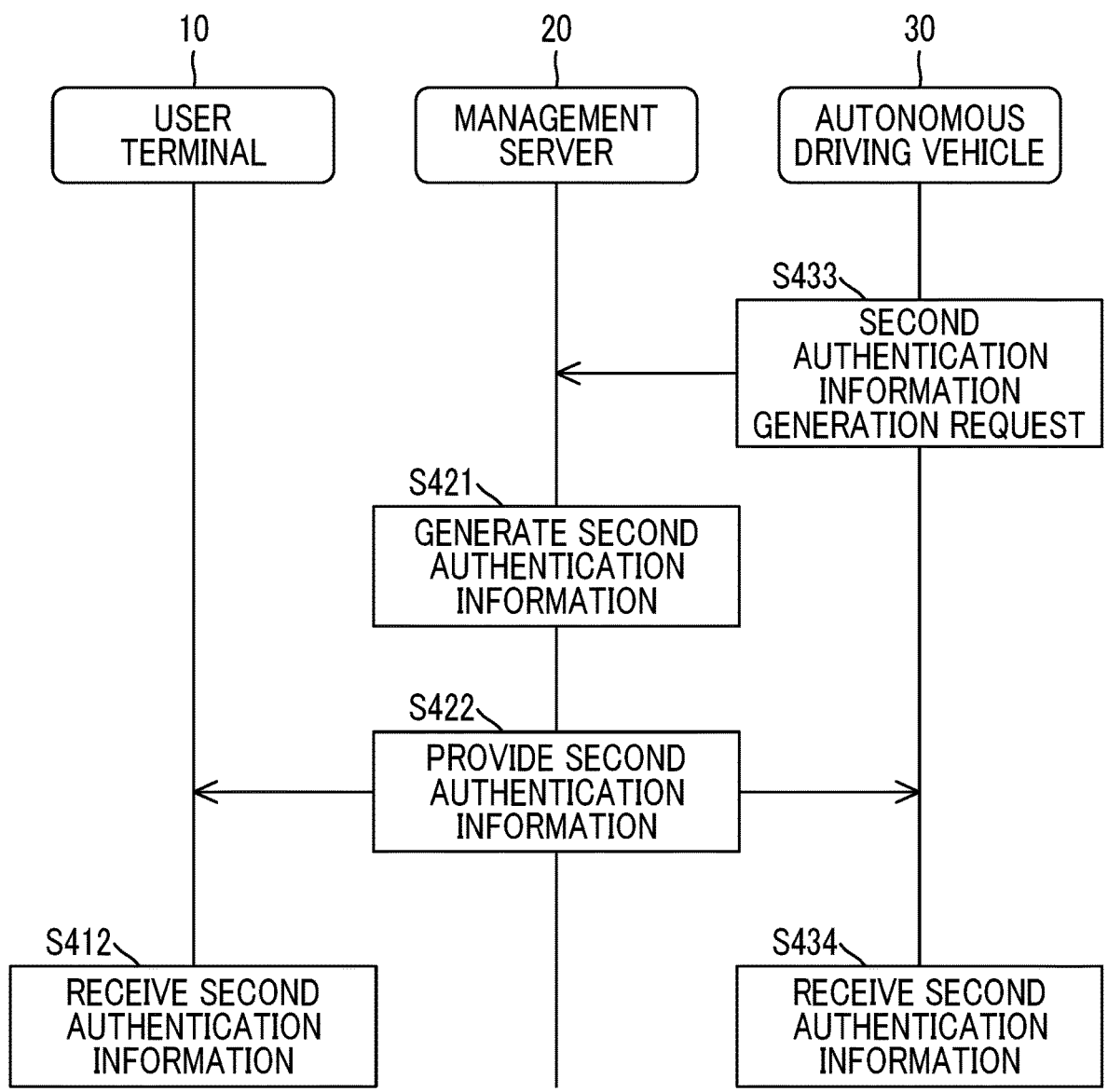
FIG. 8 is a conceptual diagram showing another example of the second authentication information provision processing according to the first embodiment of the disclosure.

FIG. 8 shows another example of the second authentication information provision processing (Step S400) according to the first embodiment of the disclosure. The control device 100 of the autonomous driving vehicle 30 sends a second authentication information generation request to the management server 20 using the communication device 40 (Step S433). The second authentication information generation request is information for requesting the management server 20 to generate and provide the second authentication information. The management server 20 generates the second authentication information in response to the second authentication information generation request (Step S421). The management server 20 provides the generated second authentication information to the user terminal 10 and the autonomous driving vehicle 30 (Step S422). The control device 100 of the autonomous driving vehicle 30 receives the second authentication information from the management server 20 through the communication device 40 (Step S434). The user terminal 10 receives the second authentication information from the management server 20 (Step S412).

In the first embodiment of the disclosure, the second authentication information for use in the second authentication processing is different from the first authentication information for use in the first authentication processing. In the specification, the term "different" means that types are different or the types are identical but contents are different.

The sequence of Steps S300 and S400 is optional. In a case where Steps S300 and S400 are completed, the process progresses to next Step S500.

1-4-5. Second Authentication Processing (Step S500)

The control device 100 performs the second authentication processing. In the second authentication processing, the control device 100 performs authentication of the user (that is, the user who gets in the autonomous driving vehicle 30) inside the vehicle cabin of the autonomous driving vehicle 30. In order to perform authentication of the user inside the vehicle cabin of the autonomous driving vehicle 30, the control device 100 acquires the second authentication information from the user inside the vehicle cabin of the autonomous driving vehicle 30 using the above-described second authentication information acquisition device 60.

For example, the user displays a QR code indicating the second authentication information on the display unit of the user terminal 10 and puts the display unit over the second authentication information acquisition device 60 (QR code reader). The second authentication information acquisition device 60 acquires the second authentication information by reading the QR code.

As another example, the user transmits a PIN code indicating the second authentication information using the user terminal 10. The second authentication information acquisition device 60 (communication device) receives the second authentication information (PIN code) sent from the user terminal 10.

The control device 100 performs authentication of the user based on the second authentication information generated or acquired in Step S400 and the second authentication information acquired from the user using the second authentication information acquisition device 60. In a case where authentication of the user is successful, the second authentication processing is completed. In a case where the second authentication processing is completed, the process progresses to next Step S600.

1-4-6. Start Permission Processing (Step S600)

In a case where the second authentication processing is completed, the control device 100 permits the start of the autonomous driving vehicle 30. In this case, the control device 100 may perform control such that the door lock device 90 automatically locks the door of the autonomous driving vehicle 30. Thereafter, the control device 100 performs control such that the traveling device 70 starts the autonomous driving vehicle 30. The autonomous driving vehicle 30 travels from the pickup position desired by the user toward the destination.

1-5. Effects

As described above, according to the first embodiment of the disclosure, in the departure condition confirmation processing, the two-stage authentication processing is performed. Specifically, the first authentication processing is performed to the user outside the autonomous driving vehicle 30 before the release of the door lock. After the completion of the first authentication processing, the second authentication information different from the first authentication information is provided to the user, and the second authentication processing is performed to the user inside the vehicle cabin of the autonomous driving vehicle 30. In a case where the second authentication processing is completed, the start of the autonomous driving vehicle 30 is permitted.

With the first authentication processing before the release of the door lock, another person other than the user who transmits the vehicle allocation request is restrained from getting in the autonomous driving vehicle 30 arrived at the pickup position without permission. With the second authentication processing, the autonomous driving vehicle 30 is restrained from starting in a state in which the user does not get in the autonomous driving vehicle 30. For example, the autonomous driving vehicle 30 is restrained from starting without permission while the user is loading a cargo in a trunk of the autonomous driving vehicle 30.

With the two-stage authentication processing, the following effect is also obtained. For example, a case where another person who is malicious acquires the first authentication information of the user in an unauthorized manner with means, such as hacking, is considered. According to the first embodiment of the disclosure, after the completion of the first authentication processing, the second authentication information different from the first authentication information is provided to the authorized user, and the second authentication processing is performed based on the second authentication information. Accordingly, for example, even though another person can acquire the first authentication information, another person cannot pass the second authentication processing. That is, it is not possible for another person to start the autonomous driving vehicle 30.

As described above, according to the first embodiment of the disclosure, it is possible to restrain the start of the autonomous driving vehicle 30 in a state in which the user who transmits the vehicle allocation request does not get in the autonomous driving vehicle 30. That is, it is possible to restrain the start of the autonomous driving vehicle 30 unintended by the user. Accordingly, a sense of discomfort or inconvenience imposed on the user is reduced. This contribute to improvement of reliability to the autonomous driving vehicle 30 and the driverless transportation service.

2. Second Embodiment

In a second embodiment of the disclosure, the autonomous driving vehicle 30 prompts the user to perform an authentication operation (for example, put a QR code) for the second authentication processing as needed. Others are the same as those in the first embodiment. Description overlapping the first embodiment is appropriately omitted.

Figure 9:
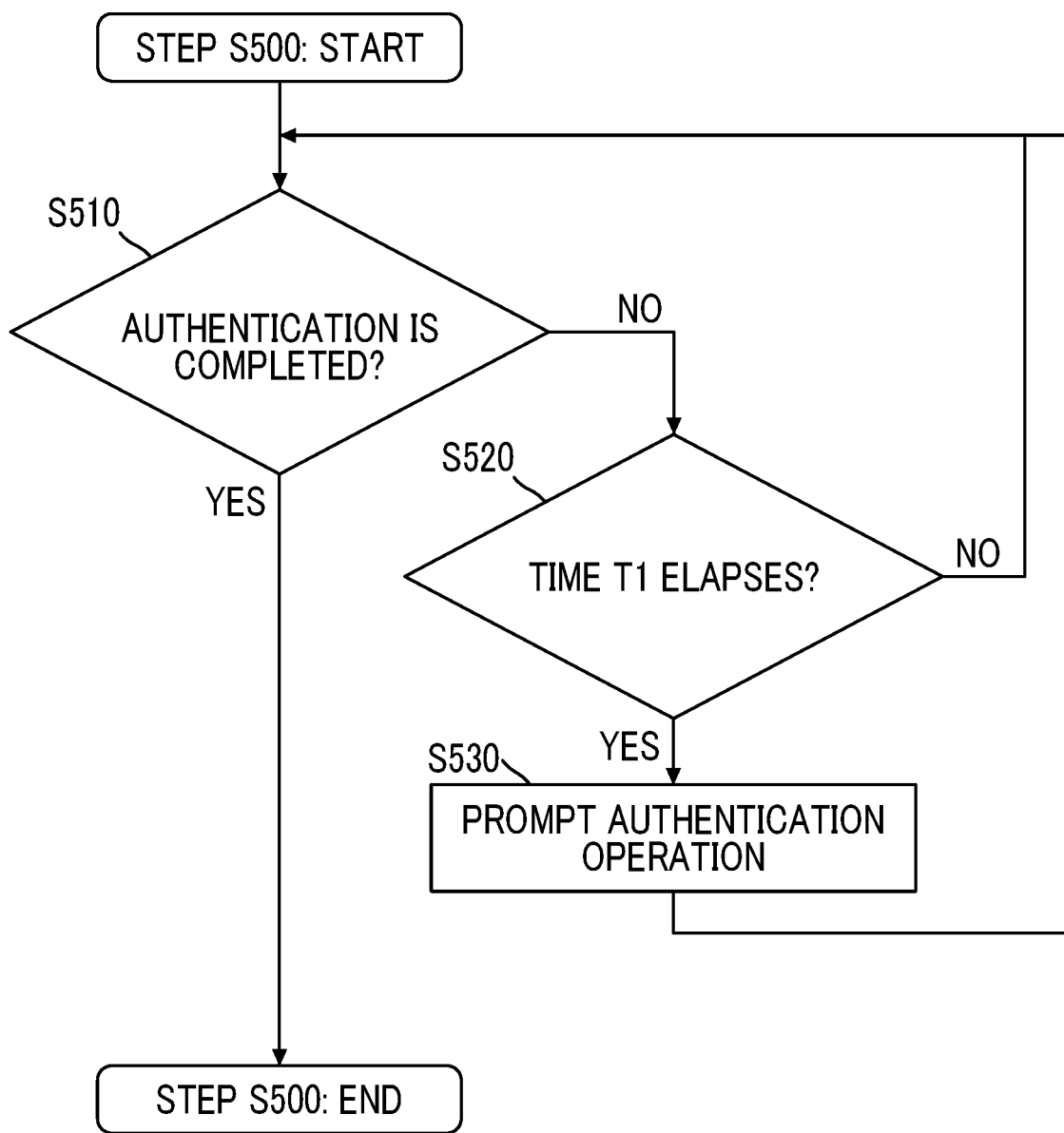
FIG. 9 is a flowchart showing second authentication processing according to a second embodiment of the disclosure.

FIG. 9 is a flowchart showing second authentication processing (Step S500) according to the second embodiment of the disclosure. The control device 100 of the autonomous driving vehicle 30 determines whether or not the second authentication processing is completed (Step S510). In a case where the second authentication processing is completed (Step S510; Yes), Step S500 ends. In a case where the second authentication processing is not completed (Step S510; No), the process progresses to Step S520.

The control device 100 measures an elapsed time after the first authentication processing (Step S200) is completed. In Step S520, the control device 100 determines whether or not the elapsed time reaches predetermined time T1. In a case where the elapsed time does not reach predetermined time T1 (Step S520; No), the process returns to Step S510. In a case where the elapsed time reaches predetermined time T1 (Step S520; Yes), the process progresses to Step S530.

In Step S530, the control device 100 prompts the user to perform an authentication operation using the HMI unit 80. For example, the control device 100 outputs voice guidance, "please make an authentication operation", using the speaker of the HMI unit 80. The control device 100 may display a message, "please make an authentication operation", on the display device of the HMI unit 80. The control device 100 may inform the user a method of an authentication operation. Thereafter, the process returns to Step S510.

As described above, according to the second embodiment of the disclosure, after the completion of the first authentication processing, in a case where the second authentication processing is not completed even when predetermined time T1 elapses, the execution of the authentication operation is prompted. With this, the autonomous driving vehicle 30 does not stay at the pickup position for a long time needlessly and is expected to start early. This results in reduction (improvement of a turnover rate) of a time on duty of the autonomous driving vehicle 30, and is preferable for a provider who provides the driverless transportation service.

3. Third Embodiment

A third embodiment of the disclosure is a modification of the second embodiment. Description overlapping the first embodiment and the second embodiment is appropriately omitted.

Figure 10:
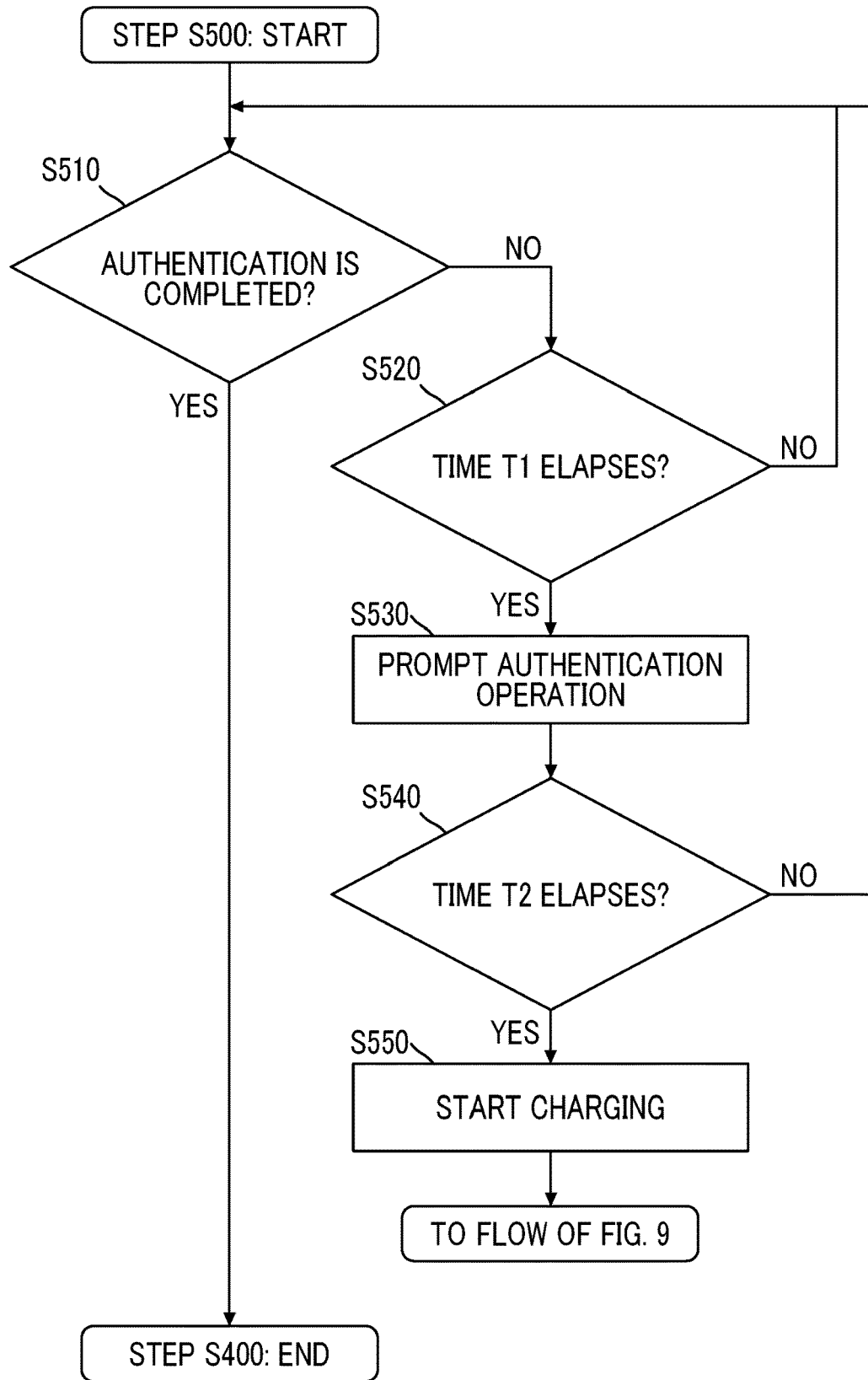
FIG. 10 is a flowchart showing second authentication processing according to a third embodiment of the disclosure.

FIG. 10 is a flowchart showing second authentication processing (Step S500) according to the third embodiment of the disclosure. Steps S510 to S530 are the same as those in the second embodiment. After Step S530, the process progresses to Step S540.

In Step S540, the control device 100 determines whether or not the elapsed time after the completion of the first authentication processing reaches predetermined time T2. Predetermined time T2 is longer than predetermined time T1. In a case where the elapsed time does not reach predetermined time T2 (Step S540; No), the process returns to Step S510. In a case where the elapsed time reaches predetermined time T2 (Step S540; Yes), the control device 100 starts charging to the user authenticated by the first authentication processing (Step S550). Thereafter, the processing flow shown in FIG. 9 is continued.

Before charging starts, the control device 100 may notify the user that "charging starts" using the HMI unit 80.

In determination about whether or not to start charging, the supply and demand of the autonomous driving vehicle 30 may be taken into consideration. For example, charging may start solely when demand exceeds supply. The autonomous driving vehicle 30 acquires information relating to supply and demand from the management server 20. The management server 20 can predict supply and demand from a past trend or the like.

A condition for starting charging may be determined based on the number of vehicles, the number of vehicles that can be currently allocated, a route plane of a vehicle that is currently traveling, a destination arrival time, or the like.

As described above, according to the third embodiment of the disclosure, after the completion of the first authentication processing, in a case where the second authentication processing is not completed even when predetermined time T2 elapses, charging to the user starts. Accordingly, an effect of reduction (improvement of a turnover rate) of the time on duty of the autonomous driving vehicle 30 is expected to be further enhanced. This is preferable for a provider who provides a driverless transportation service.

Although the embodiment of the disclosure has been described above in detail, the disclosure is not limited to the above-described embodiment, and various modifications or alterations may be made without departing from the spirit and scope of the disclosure described in the claims.

What is claimed is:

1. A vehicle control device comprising
a processor configured to:
obtain, from a first authentication device, first authentication information from a user while the user is outside of a vehicle,
perform authentication of the user outside of the vehicle based on the obtained first authentication information acquired by the first authentication device,
based on the user being authenticated using the first authentication information, unlock at least one of a plurality of locks of the vehicle, and generate and output, or request a server to generate and transmit to a terminal of the user, prompt information that prompts the user to enter second authentication information, the second authentication information being different from the first authentication information,
obtain the second authentication information from the user while the user is inside of the vehicle,
perform authentication of the user based on the obtained second authentication information, and
based on the user being authenticated using the second authentication information, start or permit the start of the vehicle.

2. The vehicle control device according to claim 1, wherein the first authentication device is provided on an outer surface of the vehicle.

3. The vehicle control device according to claim 1, wherein the first authentication information is registered in association with the user in advance and corresponds to at least one of biological information, Integrated Circuit (IC) information of the terminal of the user, or magnetic card information.

4. The vehicle control device according to claim 1, wherein the processor is further configured to generate the second authentication information and transmits the generated second authentication information to the terminal of the user.

5. A vehicle comprising the vehicle control device according to claim 1, wherein the first authentication device is provided on an outer surface of the vehicle, the first authentication device is configured to acquire the first authentication information from the user while the user is outside of the vehicle, the first authentication information being registered in association with the user in advance and corresponding to at least one of biological information, Integrated Circuit (IC) information of the terminal of the user, or magnetic card information, and second authentication information provision processing that, in response to completion of first authentication processing, causes the second authentication information to be generated and transmitted to the terminal of the user, the second authentication information being different from the first authentication information.

6. The vehicle control device according to claim 1, wherein the processor is further configured to request the server to generate and transmit the second authentication information to the terminal of the user and to the vehicle control device, and receive the second authentication information generated by the server from the server.

7. The vehicle control device according to claim 1, wherein the vehicle is an autonomous driving vehicle, and the processor is further configured to execute a driverless transportation service, which includes controlling traveling of the autonomous driving vehicle.

8. The vehicle control device according to claim 1, wherein, after completion of first authentication processing, in a case where second authentication processing is not completed after a predetermined time elapses, the processor is further configured to notify the user that charging will start and start charging the user authenticated by the first authentication processing.

9. The vehicle control device according to claim 1, wherein the first authentication information is biological information.

10. The vehicle control device according to claim 1, wherein the first authentication information is fingerprint information.

11. The vehicle control device according to claim 1, wherein the second authentication information is a quick response (QR) code or pin code.

12. The vehicle control device according to claim 1, wherein the second authentication information is different from each of biological information, and integrated circuit (IC) information.

13. The vehicle control device according to claim 1, wherein the outputting the prompt information includes at least one of: transmitting the prompt information to a display to be displayed, or transmitting the prompt information to a speaker to be audibly output.

14. A computerized method implemented by a vehicle control device that includes at least one hardware processor, the computerized method comprising:
obtaining, from a first authentication device, first authentication information from a user while the user is outside of a vehicle, performing authentication of the user outside of the vehicle based on the obtained first authentication information acquired by the first authentication device, based on the user being authenticated using the first authentication information, unlocking at least one of a plurality of locks of the vehicle, and generating and outputting prompt information that prompts the user to enter second authentication information, the second authentication information being different from the first authentication information, the outputting comprising transmitting the prompt information to a terminal of the user or requesting a server to transmit the prompt information to the terminal of the user;

obtaining the second authentication information from the user while the user is inside of the vehicle, performing authentication of the user based on the obtained second authentication information, and based on the user being authenticated using the second authentication information, starting or permitting the start of the vehicle.

15. The computerized method according to claim 14, wherein the first authentication device is provided on an outer surface of the vehicle.

16. The computerized method according to claim 14, wherein the first authentication information is registered in association with the user in advance and corresponds to at least one of biological information, or Integrated Circuit (IC) information of the terminal of the user.

17. The computerized method according to claim 14, wherein the second authentication information is obtained by a different type of acquisition technique than a type of acquisition technique used to obtain the first authentication information.

18. A non-transitory computer readable medium comprising computer-executable program code that, when executed by a processor, causes the processor to perform the computerized method of claim 14.

19. A user terminal comprising:
at least one communication interface configured to communicate with a vehicle control device of an autonomous driving vehicle and a server over a network; and
a processor configured to:
transmit, to the server via the at least one communication interface, a vehicle allocation request for the autonomous driving vehicle, the vehicle allocation request including a pick-up position desired by a user;
perform first authentication processing with the vehicle control device of the autonomous driving vehicle to unlock at least one of a plurality of locks of the autonomous driving vehicle, the first authentication processing comprising: controlling a display to display first authentication information in a format of a quick response (QR) code, or transmitting the first authentication information in a format of a PIN code from the user terminal to the vehicle control device; and
after the first authentication processing has completed, receive, from the vehicle control device or the server, via the at least one communication interface, second authentication information that, when provided to the vehicle control device, causes the autonomous driving vehicle to initiate autonomous travel.

20. The user terminal of claim 19, wherein the processor is further configured to: perform second authentication processing with the vehicle control device of the autonomous driving vehicle to start or to be permitted to start the autonomous driving vehicle, the second authentication processing comprising transmitting or displaying the second authentication information received from the vehicle control device or the server.

* * * * *